United States Patent [19]
Boeckh et al.

[11] Patent Number: 5,652,330
[45] Date of Patent: Jul. 29, 1997

[54] PREPARATION OF POLYCONDENSATES OF CITRIC ACID AND USE THEREOF IN DETERGENTS AND CLEANERS

[75] Inventors: Dieter Boeckh, Limburgerhof; Angelika Funhoff, Schriesheim; Alexander Kud, Eppelsheim; Richard Baur, Mutterstadt; Volker Schwendemann, Neustadt; Gunnar Schornick, Neuleiningen, all of Germany

[73] Assignee: BASF Aktiengesellschaft, Ludwigshafen, Germany

[21] Appl. No.: 515,806

[22] Filed: Aug. 16, 1995

[30] Foreign Application Priority Data

Aug. 22, 1994 [DE] Germany .................. 44 29 691.6

[51] Int. Cl.$^6$ ................ C08F 6/00; C08J 3/00
[52] U.S. Cl. .......... 528/486; 528/272; 528/480; 528/503; 521/50; 521/65; 510/361; 510/434
[58] Field of Search ............. 252/174.24, 174.23; 521/50, 65; 528/272, 480, 486, 503

[56] References Cited

U.S. PATENT DOCUMENTS 2,416,485  2/1947  Lasher .
5,217,542  6/1993  Nakamura et al. .

FOREIGN PATENT DOCUMENTS 0 433 010  6/1991  European Pat. Off. .

OTHER PUBLICATIONS

Chemical Abstract, AM 87–288520/41, JP 62/201,926, Sep. 5, 1987.

Primary Examiner—James J. Seidleck
Assistant Examiner—Duc Truong
Attorney, Agent, or Firm—Oblon, Spivak, McClelland, Maier & Neustadt, P.C.

[57] ABSTRACT

Process for preparing polycondensates of citric acid and/or isocitric acid, by converting (a) citric acid, isocitric acid or mixtures thereof in an organic solvent in the presence of a water-withdrawing agent at least partially into the anhydride form and then condensing the reaction mixture, if desired after addition of two cocondensable compounds selected from the group consisting of (b) other hydroxycarboxylic acids and/or (c) amino acids, alcohols, amines and/or at least dibasic carboxylic acids other than carboxylic acids (a) and (b), at temperatures of at least 80° C. to form polycarboxylates which have an average molecular weight of at least 500, polycondensates of citric acid and/or isocitric acid obtainable thereby, and use of said polycondensates as ingredients in phosphate-free and reduced-phosphate detergents and cleaners, and also detergents and cleaners which contain at least one surfactant and optionally builders and other customary constituents with from 0.1 to 30% by weight of an abovementioned polyestercarboxylate.

7 Claims, No Drawings

PREPARATION OF POLYCONDENSATES OF CITRIC ACID AND USE THEREOF IN DETERGENTS AND CLEANERS

The present invention relates to a process for preparing polycondensates of citric acid and isocitric acid and to the use of the polycondensates as an ingredient of phosphate-free and reduced-phosphate detergents and cleaners.

U.S. Pat. No. 2,416,485 discloses polyesters prepared by heating hydroxyated oils with, for example, citric acid and lactic acid at temperatures of about 180° to 200° C. The resins are used for example in rubber mixtures, as coating material or as adhesive.

EP-A-0 433 010 discloses polycarboxylates which are preparable, for example, by reaction of citric anhydride with polyvinyl alcohol or polyallyl alcohol. The polyvinyl or polyallyl citrates thus obtainable are used as builders in detergents.

U.S. Pat. No. 5,217,542 discloses using water-soluble or -dispersible polyesters obtainable by sole condensation of, for example, mixtures of tartaric acid or tartaric anhydride and citric acid in a molar ratio of 1:0.1 to 1:4 as an ingredient of detergents. The condensation can optionally also be carried out in the additional presence of up to 60 mol % of malic acid or up to 90 mol % of lactic acid or glycolic acid.

JP-A-62/201,926 discloses polymers of hydroxypolycarboxylic acids. For example, polymalic acid is obtained by heating malic acid to a temperature of 140° C. under reduced pressure. The polymers thus obtainable are used for example for manufacturing suture material which is absorbed by the body.

It is an object of the present invention to provide a novel process for preparing condensates of citric acid which, compared with the polycarboxylic acid condensates previously used, have an improved incrustation-inhibiting effect in detergents.

We have found that this object is achieved by a process for preparing polycondensates of citric acid and/or isocitric acid, which comprises converting (a) citric acid, isocitric acid or mixtures thereof in an organic solvent in the presence of a water-withdrawing agent at least partially into the anhydride form and then condensing the reaction mixture, if desired after addition of two cocondensable compounds selected from the group consisting of (b) other hydroxycarboxylic acids and/or (c) amino acids, alcohols, amines and/or at least dibasic carboxylic acids other than carboxylic acids (a) and (b), at temperatures of at least 80° C. to form polycarboxylates of citric acid and/or isocitric acid which have an average molecular weight of at least 500.

The present invention also provides polycondensates of citric acid and/or isocitric acid, which are obtainable by the above-described process.

The present invention further provides for the use of the above-described polycondensates of citric acid and/or isocitric acid as an ingredient of phosphate-free and reduced-phosphate detergents and cleaners.

The present invention also provides detergent and cleaner compositions comprising at least one surfactant and optionally builders and other customary constituents, containing from 0.1 to 30% by weight of a polyestercarboxylate obtainable by converting (a) citric acid, isocitric acid or mixtures thereof in an organic solvent in the presence of a water-withdrawing agent at least partially into the anhydride form and then condensing the reaction mixture, if desired after addition of two cocondensable compounds selected from the group consisting of (b) other hydroxycarboxylic acids and/or (c) amino acids, alcohols, amines and/or at least dibasic carboxylic acids other than carboxylic acids (a) and (b), at temperatures of at least 80° C. to form polycarboxylates of citric acid and/or isocitric acid which have an average molecular weight of at least 500.

The polyestercarboxylates prepared by condensation of citric acid alone contain units of the formulae I and II

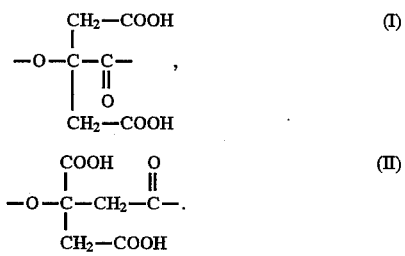

while the condensation of isocitric acid alone gives rise to polycondensates with structural units III to V:

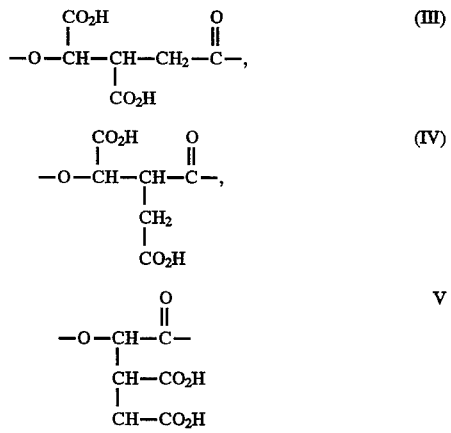

In addition to the linear structural units shown here, the polycondensates of the present invention contain branching due to esterification of citric acid or isocitric acid units in previously formed polymer chains, depending on the choice of reaction conditions.

The polyester carboxylates are prepared using citric acid, isocitric acid or mixtures thereof as component (a). The use of citric acid is preferred.

Component (b) comprises hydroxycarboxylic acids. These can be, for example, mono- or dihydroxymonocarboxylic acids, dihydroxydicarboxylic acids or monohydroxydicarboxylic acids. Suitable for use as component (b) are for example malic acid, tartronic acid, glycolic acid, lactic acid, hydroxybutyric acid, hydroxyvaleric acid, hydroxycaproic acids, tartaric acid, bis(hydroxymethyl) propionic acid and glyceric acid. The compounds of group (b) can be used either alone or intermixed, for example mixtures of lactic acid and malic acid or mixtures of malic acid and glycolic acid.

Compounds of group (c) can be amino acids, alcohols, amines and/or at least dibasic carboxylic acids other than carboxylic acids (a) and (b). Such carboxylic acids are for example aliphatic or aromatic di- or tricarboxylic acids, for example succinic acid, maleic acid, fumaric acid, adipic acid, oxalic acid, propanetricarboxylic acid or aconitic acid or alkenylsuccinic acids, for example butenylsuccinic acid, octenylsuccinic acid or dodecenylsuccinic acid.

Suitable compounds of group (c) also include amines. Examples thereof are $C_1$–$C_{18}$-alkylamines such as methylamine, ethylamine, butylamines, cyclohexylamine and stearylamine, ethylenediamine, propylenediamine, hexamethylenediamine, diethylenetriamine, triethylenetetramine, polyethyleneimine, ethanolamine, diethanolamine and triethanolamine.

Suitable compounds of group (c) also include alcohols. Examples thereof are monohydric $C_1$–$C_{18}$-alcohols, such as methanol, ethanol, n-propanol, isopropanol, n-butanol, isobutanol, cyclohexanol, 2-ethylcyclohexanol, benzyl alcohol, phenylethanol and stearyl alcohol. It is also possible to use polyhydric alcohols such as ethylene glycol, propylene glycol, 1,4-butanediol, 1,6-hexanediol, alkoxylated monohydric and polyhydric alcohols, for example mono- to pentacontaethoxylated (1–50) $C_1$–$C_{18}$-alcohols and polyalkylene glycols, in particular polyethylene glycols having molecular weights of up to 5000.

Also suitable for use as component (c) are amino acids. Examples are glycine, glutamic acid, aspartic acid, alanine, valine, leucine, isoleucine, proline and serine.

The polycondensates are prepared using for example, (a) per 1 mol of citric acid and/or isocitric acid, (b) from 0 to 100 mol % of at least one other hydroxycarboxylic acid and/or (c) from 0 to 40 mol % of amino acids, alcohols, amines and/or at least dibasic carboxylic acids, other than carboxylic acids (a) and (b).

Preferably citric acid is condensed alone to prepare polycitric acids. The anhydride formation from the compounds of component (a) and the reaction of the anhydrides with the compounds (a), the anhydrides obtained from (a) and optionally the cocondensable compounds (b) and/or (c) is preferably repeated one or more times. For example, single to ninefold repetition (twofold to tenfold replication) of anhydride formation and reaction of the anhydrides with the free OH groups of the compounds of the cocondensable substances (b) and/or (c) or else with the OH group of citric anhydride will give polycondensates having a higher molecular weight. For example, the average molecular weight of the polycondensates ranges from 500 to 25,000, and is customarily within the range from 600 to 8000.

The polycondensation of component (a) and optionally (d) and/or (c) takes place in an organic solvent. Suitable solvents are for example all polar aprotic solvents and also liquid monobasic carboxylic acids. Specific examples of solvents are tetrahydrofuran, dioxane, ethylene glycol dimethyl ether, diethylene glycol dimethyl ether, N-methylpyrrolidone, N,N-dimethylformamide, acetic acid, propionic acid and mixtures thereof. Preference is given to using dioxane, tetrahydrofuran or anhydrous acetic acid as organic solvent. The concentration of components (a) and optionally (b) and/or (c) in the organic solvent can be varied within a wide range. It is for example from 5 to 90, preferably from 10 to 75,% by weight, based on the reaction mixture.

If cyclic ethers are used as solvents for the polycondensation, the reaction conditions may cause them to become incorporated into the polycondensates to some extent.

The condensation is carried out in the presence of a water-withdrawing agent. This term is to be understood as comprehending all compounds which combine, for example, with anhydrous citric acid under withdrawal of water to form a cyclic anhydride, ie. citric anhydride. Suitable for this purpose are for example anhydrides of monobasic carboxylic acids such as acetic anhydride and propionic anhydride and also mixed anhydrides of, for example, acetic acid and formic acid. Other water-withdrawing compounds are acid chlorides such as acetyl chloride and propionyl chloride, phosgene, thionyl chloride, phosphorus oxychloride and dicyclohexylcarbodiimide. The water-withdrawing agents can be used, depending on their reactivity, in substoichiometric, stoichiometric or superstoichiometric amounts, based on citric acid or isocitric acid. In most cases up to 2 mol, preferably from 0.2 to 0.8 mol, of a water-withdrawing agent will be used at every condensation stage per mole of citric acid or isocitric acid. A particularly preferred water-withdrawing agent is acetic anhydride. The polycondensation with acetic anhydride as water-withdrawing agent is preferably carried out in acetic acid as organic solvent.

The polycondensates of citric acid and/or isocitric acid are prepared by a two-stage process whose first stage comprises converting citric acid or isocitric acid at least partly into the anhydride form. The anhydride formation in the presence of a water-withdrawing agent is carried out for example within the temperature range from 10° to 80° C., preferably from 40° to 80° C. At a temperature of at least 80° C., the anhydrides formed in the first stage of the reaction react with the OH groups of citric acid, isocitric acid, citric anhydride or isocitric anhydride. Anhydride formation and condensation of the anhydrides in the second stage can also be carried out at a single temperature if the condensation proceeds sufficiently rapidly. Preferably, however, the reaction is controlled so that the temperature during polycondensation in the second stage of the process is at least 10° C., preferably at least 30° C., above the temperature at which the anhydrides are formed from the compounds of component (a). The condensation temperature in the second stage of the process is, for example, from 80° to 150° C., preferably from 95° to 140° C. If the reaction mixture contains volatile constituents which vaporize at the temperatures at which the polycondensation is carried out, the polycondensation is carried out in pressuretight sealed vessels.

The two stages of the process, anhydride formation and condensation, are preferably carried out repeatedly in succession, with only part of the citric acid/isocitric acid being converted into the anhydride each time. In addition to anhydride formation from the free citric acid, already cocondensed citric acid units can be converted back into the anhydride if they still have two free COOH groups. If these anhydrides are not in the terminal position of already condensed oligo- or polymers, they can lead to branching in the polycondensates.

The polycondensation can optionally be carried out in the presence of catalysts. Suitable catalysts include in particular inorganic mineral acids such as sulfuric acid, phosphoric acid, phosphorous acid, hypophosphorous acid and strong organic acids such as sulphonic acids and/or phosphonic acids. Examples are p-toluenesulfonic acid, benzenesulfonic acid, sulfosuccinic acid, methylsulfonic acid, methylphosphonic acid and ethylphosphonic acid. Other basically suitable catalysts include Lewis acids, for example boron trifluoride, boron trichloride, aluminum trichloride, iron(III) chloride, zinc chloride, etc. Mixtures of catalysts can also be used. If catalysts are used in the polycondensation, this is done in amounts of, for example, from 0.1 to 5% by weight. Usually, not more than 1% by weight is required of a catalyst, based on the compounds to be condensed.

Particular preference is given to a procedure where a solution of (a) citric acid and/or isocitric acid in anhydrous acetic acid is partially converted into citric anhydride and/or isocitric anhydride by addition of acetic anhydride as water-withdrawing agent at temperatures of up to 80° C. and the reaction mixture is then condensed by heating to a temperature which is in the range from 80° to 150° C. The use of anhydrous acetic acid as organic solvent is also preferred for the preparation of those polyestercarboxylates where citric acid or isocitric acid is reacted with the compounds of group (b) and/or (c). For instance, a solution of citric anhydride or of isocitric anhydride in acetic acid can be admixed with (b) malic acid, glycolic acid, lactic acid or mixtures thereof and condensed by heating to a temperature within the range from 80° to 150° C. The condensation can optionally be carried out in the additional presence of (c) amino acid, alcohols, amines and/or at least dibasic carboxylic acids other than carboxylic acids (a) and (b). For instance, the use of ethylene glycol leads to a molecular weight increase for the polyestercarboxylates. The polyestercarboxylates obtainable on condensation with the water-withdrawing agent can be substituted at the terminal OH group of the polyester by acyl radicals stemming, for example, from the water-withdrawing agent. The polyesterpolycarboxylates therefore frequently carry an acetyl end group if, for example, acetic anhydride or acetyl chloride has been used as water-withdrawing agent. However, such substitutions have a molecular-weight-limiting effect on the polycondensation. They can be favored by the choice of minimally selective conditions for the reaction with the water-withdrawing agent, to limit the degree of polymerisation. It is preferable, however, to choose conditions which selectively favor the reaction through water elimination and formation of cyclic anhydrides and lead to very high molecular weights in the polycondensation.

The polyestercarboxylates obtainable according to the present invention need not necessarily have a linear construction, but can also have branching points due to the condensation of already cocondensed non-terminal citric acid with free citric acid or a polyester chain having a free OH group. The polyesterpolycarboxylates obtainable by the process of the present invention can be converted into salts with aqueous or alcoholic bases. To suppress or prevent cleavage of ester bonds, the neutralization is preferably carried out at temperatures below 30° C. and special care is taken to ensure that the pH of the reaction mixture is within the range from 3.5 to 9.5, preferably from 4 to 7.5, during the neutralization. The neutralization is preferably carried out in an aqueous medium. To prevent any slow hydrolysis of the neutralized polyesterpolycarboxylates in an aqueous medium, the completely or partially neutralized polyesterpolycarboxylates can be recovered from the solutions by evaporating the particular solvent. This yields powders or granules with a virtually unlimited storage life. The polyesterpolycarboxylates are suitably neutralized with hydroxides, oxides, carbonates and bicarbonates of the alkali and alkaline earth metals and also ammonia, amines such as trimethylamine, triethylamine, butylamine and stearylamine, triethanolamine, diethanolamine, ethanolamine and morpholine. Preference is given to using sodium hydroxide solution, potassium hydroxide solution, ammonia, sodium carbonate, sodium bicarbonate, magnesium oxide or calcium hydroxide.

The above-described polycondensates of citric acid and/or isocitric acid are used as ingredients in phosphate-free and reduced-phosphate detergents and cleaners. The polyesterpolycarboxylates are biodegradable and, when used in detergents, inhibit incrustation of the fabric during the wash as well as promoting soil release. The compositions of detergent formulations can vary widely. The same is true of the compositions of cleaner formulations. Detergent and cleaner formulations customarily contain from 1 to 50% by weight of surfactants with or without builders. These figures apply both to liquid and to pulverulent detergent and cleaner formulations. Examples of the compositions of suitable detergent formulations customary in Europe, the U.S. and Japan may be found for example in table form in Chemical and Eng. News 67 (1989), 35. Further information about the compositions of detergents and cleaners is given in Ullmann's Encyklopädie der technischen Chemie, Verlag Chemie, Weinheim 1983, 4th edition, pages 63–160. Detergents may additionally contain a bleaching agent, for example sodium perborate or percarbonate, which may be present in the detergent formulation in amounts of up to 30% by weight. Detergents and cleaners may contain further customary additives, for example complexing agents, opacifiers, optical brighteners, enzymes, perfume oils, color transfer inhibitors, grayness inhibitors, soil release polymers and/or bleach activators.

The above-described polyesterpolycarboxylates are used according to the present invention in detergents having a reduced phosphate content (which is to be understood as meaning a phosphate content of less than 25% by weight of sodium triphosphate) or in phosphate-free detergents and also in cleaners. The polycarboxylates can be included in the detergent formulation in the form of a granulation, a powder, a paste, a high-viscosity composition, as a dispersion or as a solution in a solvent. The polycarboxylates can also be absorbed on the surface of standardizing agents, for example sodium sulfate or builders (zeolites or bentonites) and also on other solid detergent additives. Detergent and cleaner formulations contain for example from 0.1 to 30, preferably from 0.5 to 10,% by weight, of a polycondensate of citric acid and/or isocitric acid.

The polyesterpolycarboxylates to be used according to the present invention can also cooperate synergistically with other known detergent additives (for example grayness inhibitors, clay dispersants, primary detergency enhancers, color transfer inhibitors, bleach activators) in pulverulent and liquid detergents (phosphate-containing and phosphate-free) to create effects leading to the augmentation not only of the incrustation inhibition but also of the action of other detergent additives.

The polyesterpolycarboxylates were characterized in the acid form by MALDI mass spectroscopy (MALDI=matrix assisted laser desorption ionization), the reported data in the examples indicating the frequency distribution maxima and the upper molecular weight limit obtained.

EXAMPLES

Preparation of polyesterpolycarboxylates

Example 1

96.0 g of anhydrous citric acid were dissolved in 96 g of dioxane at 60° C. and 25.5 g of acetic anhydride were added in the course of 1 h. After a further 30 min at 60° C. the batch was heated to 100° C. and held at 100° C. for 1 h. Subsequently it was cooled back down to 60° C. The cycle of acetic anhydride addition, heating at 60° C., heating at 100° C. and cooling was repeated three times, adding 25.5 g, 10.2 g and 10.2 g of acetic anhydride, respectively. The glacial acetic acid/dioxane azeotrope was then distilled off in a rotary evaporator. To remove remaining acetic acid, two 200 g lots of dioxane were added and the dioxane/glacial acetic acid mixture was distilled off. The product was suspended in water and adjusted with 20% strength NaOH to pH 7 at from 0° to 10° C. The polysodium salt was freeze-dried.

The polyesterpolycarboxylate was subjected to MALDI-MS (MS=mass spectroscopy) and found to have a broad bimodal distribution with maxima at 1300 and 5100. The highest molecular weight obtained was 7000.

Example 2

96.0 g of anhydrous citric acid were suspended in 96 g of glacial acetic acid at 60° C. and 25.5 g of acetic anhydride were added in the course of 1 h. After a further 30 min at 60° C. the batch was heated to 100° C. and held at 100° C. for 1 h. Subsequently it was cooled back down to 60° C. The cycle of acetic anhydride addition, heating at 60° C., heating at 100° C. and cooling was repeated three times, adding 20.4 g, 7.7 g and 7.7 g of acetic anhydride, respectively. The glacial acetic acid was then distilled off in a rotary evaporator. To remove remaining acetic acid, two 200 g lots of dioxane were added and the dioxane/glacial acetic acid mixture was distilled off. The product was suspended in water and adjusted with 20% strength NaOH to pH 7 at from 0° to 10° C. The polysodium salt was freeze-dried.

The polyesterpolycarboxylate was subjected to MALDI-MS (MS=mass spectroscopy) and found to have a broad bimodal distribution with maxima at 900 and 5200. The highest molecular weight obtained was 9000.

Example 3

384 g of anhydrous citric acid were suspended in 384 g of dioxane at 60° C. and 102 g of acetic anhydride were added in the course of 30 min. After a further 30 min at 60° C. 67 g of D,L-malic acid were added, and the batch was heated to 100° C. and held at 100° C. for 30 min. The dioxane/glacial acetic acid azeotrope was then distilled off at the same temperature under reduced pressure. Subsequently the batch was cooled back down to 60° C. The cycle of acetic anhydride addition, heating at 60° C., heating at 100° C. and cooling was repeated three times, adding 102 g, 81.6 g and 81.6 g of acetic anhydride, respectively, and, at the end of the second 60° C. period, a further 67 g of malic acid. The glacial acetic acid was then distilled off in a rotary evaporator. To separate off remaining acetic acid, two 200 g lots of dioxane were added and the dioxane/glacial acetic acid mixture was distilled off. The product was suspended in water and adjusted with 20% strength NaOH to pH 7 at from 0° to 10° C. The polysodium salt was freeze-dried. The polymer had an average molecular weight of 1200 (determined by MALDI mass spectroscopy).

Example 4

Example 3 was repeated with 2×50 g of lactic acid instead of the malic acid. The polymer had an average molecular weight of 1400 (determined by MALDI mass spectroscopy).

Example 5

384 g of anhydrous citric acid were suspended in 384 g of glacial acetic acid at 60° C. and 102 g of acetic anhydride were added in the course of 30 min. After a further 30 min at 60° C. 54 g of benzyl alcohol were added, and the batch was heated to 100° C. and held at 100° C. for 30 min. Subsequently the batch was cooled back down to 60° C. The cycle of acetic anhydride addition, heating at 60° C., heating at 100° C. and cooling was repeated three times, adding 102 g, 81.6 g and 81.6 g of acetic anhydride, respectively, and, at the end of the second 60° C. period, a further 54 g of benzyl alcohol. The glacial acetic acid was then distilled off in a rotary evaporator. The product was suspended in water and adjusted with 20% strength NaOH to pH 7 at from 0° to 10° C. The polysodium salt was freeze-dried. The polymer had an average molecular weight of 1200.

Example 6

Example 4 was repeated with 2×261 g of heptaethoxylated $C_{13/15}$ alcohol instead of the benzyl alcohol. The polymer had an average molecular weight of 2400.

Example 7

Example 4 was repeated with 2×375 g of a polyethylene oxide of average molecular weight (Mn)=1500 instead of the benzyl alcohol. The polymer had an average molecular weight of 3700.

Application examples

To test the incrustation-inhibiting effect of the above-described polyesterpolycarboxylates, they were incorporated in a washing powder formulation with which cotton test fabrics were washed. The number of wash cycles was 15. Following this number of washes, the ash content of the fabric was determined by ashing each test fabric.

Composition of detergent 1

8.0% of alkylbenzenesulfonate 7.0% of $C_{13/15}$ oxo process alcohol ethoxylated with 7 mol of ethylene oxide 2.0% of coco fat soap 1.0% of carboxymethylcellulose 36.0% of zeolite A 12.0% of sodium carbonate 22% of sodium perborate 2.0% of tetraacetylethylenediamine 0.2% of optical brightener 0.5% of enzymes 5.0% of polymer (polyesterpolycarboxylate or comparison)

Balance to 100%: sodium sulfate

TABLE 1

| Washing conditions Instrument: Launder-o-meter from Atlas, Chicago | |
|---|---|
| Number of wash cycles: | 15 |
| Wash liquor: | 250 ml of liquor |
| Washing time: | 30 min at 60° C. |
| Detergent dosage: | 4.5 g/l |
| Water hardness: | 22.4° of German hardness (4 mmol of Ca/l; Ca:Mg = 4:1) |
| Test fabric: | 20 g of cotton cheese cloth |

Table 2 shows the ash content of the test fabric after 15 washes on washing without addition and with standard additives.

TABLE 2

| Example | Comparative Example | Addition (5%) | % Ash |
|---|---|---|---|
| | 1 | — | 3.26 |
| | 2 | AA/MA copolymer[a] | 1.79 |
| | 3 | Sodium citrate | 2.12 |
| 8 | — | Product of Ex. 1 | 0.46 |
| 9 | — | Product of Ex. 2 | 0.50 |

[a] copolymer of acrylic acid and maleic acid in weight ratio of 70:30, having a K value of 60 (measured by the method of H. Fikentscher, Cellulose-Chemie 13 (1932), 58–64 and 71–74, on the sodium salt at pH 7 and 25° C. in 1% strength aqueous solution)

Detergent 2

9.00% of sodium laurylsulfate 10.00% of $C_{13/15}$ oxo process alcohol ethoxylated with 7 mol of ethylene oxide 0.30% of coco fat soap 1.20% of carboxymethylcellulose 36.50% of zeolite A 10.30% of sodium carbonate 4% of sodium sulfate 14.4% of sodium perborate 4.20% of TAED 2.40% of sodium silicate 8.00% of polymer (in-test substance or comparison)

Balance to 100%: water

TABLE 3

| Washing conditions Instrument: Launder-o-meter from Atlas, Chicago | |
|---|---|
| Number of wash cycles: | 15 |
| Wash liquor: | 250 ml of liquor |
| Washing time: | 30 min at 60° C. |
| Detergent dosage: | 6.0 g/l |
| Water hardness: | 22.4° of German hardness (4 mmol of Ca/l; Ca:Mg = 4:1) |
| Liquor ratio: | 12.5:1 |
| Test fabric: | 20 g of cotton cheese cloth |

Table 4 shows the ash content of the test fabrics on washing without addition and with standard additives.

TABLE 4

| | | Ash contents of test fabrics after 15 washes with detergent formulation 2 | |
|---|---|---|---|
| Example | Comparative Example | Addition | % Ash |
| | 4 | — | 4.83 |
| | 5 | AA/MA copolymer as in Comparative Example 2 | 1.95 |
| | 6 | Sodium citrate | 3.75 |
| 10 | — | Product of Example 1 | 2.70 |
| 11 | — | Product of Example 2 | 2.91 |

We claim:

1. A process for preparing polyester carboxylate polycondensates of citric acid and/or isocitric acid, which comprises converting (a) citric acid, isocitric acid or mixtures thereof in an organic solvent in the presence of a water-withdrawing agent at least partially into the anhydride form and then condensing by esterification the reaction mixture, optionally after addition of two cocondensable compounds selected from the group consisting of (b) other hydroxycarboxylic acids and/or (c) amino acids, alcohols, amines and/or at least dibasic carboxylic acids other than carboxylic acids (a) and (b), at temperatures of at least 80° C. to form polycarboxylates of citric acid and/or isocitric acid which have an average molecular weight of at least 500, said polycarboxylates of citric acid containing units of the formula I and II or branched esterification condensates thereof

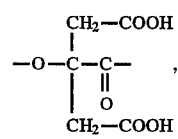

(I)

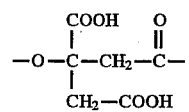

(II)

and said polycarboxylates of isocitric acid containing units of the formulae III to V or branched esterification condensates thereof

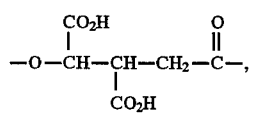

(III)

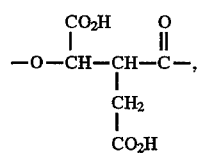

(IV)

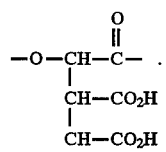

V

2. A process as claimed in claim 1, wherein the amounts used (a) per 1 mol of citric acid and/or isocitric acid are (b) from 0 to 100 mol % of at least one other hydroxycarboxylic acid and/or from 0 to 40 mol % of amino acids, alcohols, amines and/or at least dibasic carboxylic acids, which differ from the carboxylic acids (a) and (b).

3. A process as claimed in claim 1, wherein the anhydride formation from the compounds of component (a) and reaction of the anhydrides with compounds (a), the anhydrides obtained from (a) and optionally (b) and/or (c) is repeated one or more times.

4. A process as claimed in any of claims 1 to 3, wherein a solution of
   (a) citric acid and/or isocitric acid in acetic acid is partially converted into citric anhydride and/or isocitric anhydride at temperatures up to 80° C. by the addition of acetic anhydride as water-withdrawing agent and the reaction mixture is subsequently condensed by heating to a temperature within the range from 80° to 150° C.

5. A process as claimed in claim 1, wherein a solution of citric anhydride or of isocitric anhydride in acetic acid is admixed with
   (b) malic acid, glycolic acid, lactic acid or mixtures thereof and condensed by heating to a temperature within the range from 80° to 150° C.

6. A process as claimed in claim 1, wherein the condensation is carried out in the additional presence of
   (c) amino acids, alcohols, amines and/or at least dibasic carboxylic acids other than carboxylic acids (a) and (b).

7. Polycondensates of citric acid and/or isocitric acid prepared by the process of claim 1.

* * * * *